US006567383B1

(12) United States Patent
Böhnke (10) Patent No.: US 6,567,383 B1
(45) Date of Patent: May 20, 2003

(54) HEADER STRUCTURE FOR TDD SYSTEMS

(75) Inventor: Ralf Böhnke, Esslingen (DE)

(73) Assignee: Sony International (Europe) GmbH, Berlin (DE)

(*) Notice: Subject to any disclaimer, the term of this patent is extended or adjusted under 35 U.S.C. 154(b) by 0 days.

(21) Appl. No.: 09/250,836

(22) Filed: Feb. 16, 1999

(30) Foreign Application Priority Data

Feb. 18, 1998 (EP) ............................................. 98102834

(51) Int. Cl.[7] ................................................. H04J 3/00
(52) U.S. Cl. ...................... 370/280; 370/294; 370/458
(58) Field of Search ................................. 370/280, 294, 370/276, 277, 336, 458, 485, 498, 279, 337, 347, 474, 475, 478

(56) References Cited

U.S. PATENT DOCUMENTS

| 5,241,545 A | * | 8/1993 | Kazecki et al. | 370/280 |
|---|---|---|---|---|
| 5,420,851 A | * | 5/1995 | Seshadri et al. | 370/280 |
| 5,504,775 A | | 4/1996 | Chouly et al. | 375/205 |
| 5,606,560 A | * | 2/1997 | Malek et al. | 370/337 |
| 5,920,547 A | * | 7/1999 | Werth | 370/280 |

FOREIGN PATENT DOCUMENTS

| EP | 0 415 502 A2 | 3/1991 |
|---|---|---|
| EP | 0 720 321 A1 | 7/1996 |
| WO | WO 95/12931 | 5/1995 |
| WO | WO 96/39749 | 12/1996 |

* cited by examiner

Primary Examiner—Chau Nguyen
Assistant Examiner—Soon-Dong Hyun
(74) Attorney, Agent, or Firm—Frommer Lawrence & Haug LLP; William S. Frommer (57) ABSTRACT

The present invention relates to a header structure for a TDD system which uses preferably an OFDM transmission system. Thereby a header slot according to the present invention fits entirely into one time slot of the GSM TDD structure. The header slot HS comprises a downlink channel DC and an uplink channel UC. The downlink channel DC comprises a synchronization channel SYNCH, a general broadcast channel GBCCH as well as an optional broadcast channel OBCCH. The uplink channel comprises a random access channel RACH. Both the synchronization channel SYNCH and the general broadcast channel GBCCH can comprise two identical repeated symbols S1, S2. The repetition of the identical symbols S1, S2 provides for a very efficient (secure) data transmission and a high-efficient correlation in view of a frequency and time synchronization due to the large number of samples in the symbols of the synchronization channel SYNCH and the general broadcast channel GBCCH.

24 Claims, 7 Drawing Sheets

HEADER STRUCTURE FOR TDD SYSTEMS

The present invention generally relates to header structures for TDD (time divisional duplex) systems, and particularly to a wireless transmission method and a wireless transmission system using a time division duplex systems using such header structures.

TDD (time division duplex) systems are well known in the state of the art. As an example the DECT-standard is cited. In time division duplex systems frames are used which comprise a plurality of timeslots. According to the state of the art some of the timeslots of a frame are dedicated for the transmission of data from a base station of the TDD system to mobile stations, which is called downlink channel, and the other timeslots are dedicated to the transmission of information from a mobile station to the base station of the TDD system, which is called uplink channel. One timeslot according to the state of the art is dedicated either for the uplink channel communication or the uplink channel communication.

Figure 2:
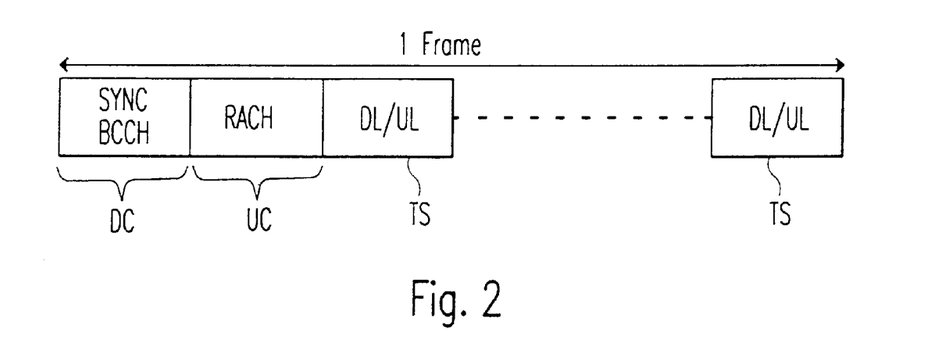
FIG. 2 shows a typical timeslot structure of a frame according to a TDD (time division duplex) system.

A typical structure of a known TDD frame is shown in FIG. 2. In FIG. 2 the timeslots used for the transmission of voice data or other data are referenced with TS (traffic slots). Besides these traffic slots (TS) a so-called header is provided. According to the state of the art, the header occupies at least two timeslots, wherein one timeslot is used for a downlink channel header part (DC) and the other timeslot is used for an uplink channel header part. The downlink header part (DC) consists of synchronization information (SYNCH) and broadcast information (GBCCH). The second timeslot occupied by the header is reserved for uplink unsynchronized mobile station access trials (RACH, random access channel).

As the header portion occupies two timeslots of the frame structure of the TDD system, these timeslots cannot be used for example for the transmission of voice data. Thus, the effective bit rate of the transmission is decreased.

It is the object of the present invention to provide an improved header structure for a TDD system providing for an improved effective bit rate and transmission flexibility of the transmission.

The improved header structure furthermore should be advantageously compatible with a so-called OFDM system comprising a plurality of equally spaced sub-carriers.

Still further the improved header structure for the TDD system should be compatible with the well-known GSM standard.

The object of the invention is achieved by means of the features of the independent claims. The depending claims develop further the central idea of the present invention.

According to the present invention therefore a wireless transmission method is provided, wherein data is transmitted in frames according to a time divisional duplex (TDD) system. Each frame thereby comprises a header and a plurality of traffic slots. The header and the traffic slots have the same time duration. According to the present invention one single timeslot is occupied by the header, wherein the header is subdivided into a downlink channel for the transmission of synchronization data and system data from a base station to at least one mobile station, and an uplink channel for the transmission of registration data from at least one mobile station to the base station. According to the present invention therefore the header occupies only one timeslot of a TDD frame. Thus the effective bit rate of the transmission can be enhanced.

Preferably the downlink channel and the uplink channel of the header slot have the same time duration.

The downlink channel can comprise a synchronization channel and at least one broadcast channel for the transmission of cell and/or system data to all or selected mobile stations.

Preferably the synchronization channel comprises at least two identical repeated symbols. These repeated identical symbols can be used for a correlation detection such as to effect frequency and time synchronization of the transmission scheme.

The at least one broadcast channel of the header slot can comprise at least two identical repeated symbols such as to further enhance the efficiency of the correlation detection and to improve the security of the data transmission.

A general broadcast channel can be transmitted in every frame and an optional broadcast channel can be transmitted only when the capacity of the general broadcast channel is not sufficient or when specific data are to be transmitted.

At least for the transmission of the optional broadcast channel of the header slot an OFDM system with a plurality of subcarriers can be used.

At least for the transmission of the synchronization channel of the header slot an OFDM system comprising a plurality of equally spaced subcarriers can be used, wherein the time duration of a symbol of the synchronization channel can be 1/n, n being an integer greater than 1, of the time duration of the symbols and the traffic channel, and only every n-th subcarrier is modulated in the synchronization channel.

The synchronization channel can be comprised of two identical repeated symbols having respectively a time duration of 30 microseconds, wherein a basic subcarrier spacing of 4.167 kHz is used for the OFDM system and only every eighth subcarrier can be modulated in the synchronization channel. Said specific parameters are particularly preferable in view of a compatibility with GSM parameters.

In the optional broadcast channel a subset of subcarriers can be allocated to the transmission of data for a predetermined mobile station. Thereby the advantage of the flexibility of the frequency allocation of the OFDM system can be used, as according to the state of the art always the entire band width is used to transmit broadcast channel data (in single carrier systems).

The time duration of one timeslot can be equal to the time duration of one timeslot according to the GSM standard.

A preferable use of a wireless transmission method as set forth above are indoor applications and low range outdoor applications.

The present invention furthermore relates to a wireless transmission system comprising a basic station and at least one mobile station. The base station and the mobile station are adapted to transmit data in frames according to a time divisional duplex (TDD) system. The header slot occupies only one single timeslot of the frame structure of the TDD system. The header slot and the traffic slots can have the same time duration. Furthermore, the header slot can be subdivided into a downlink channel for the transmission of synchronization data and system data from said base station to said at least one mobile station, and an uplink channel for the transmission of registration data from said at least one mobile station to the base station.

The downlink channel and the uplink channel can have the same time duration.

The downlink channel can comprise a synchronization channel and at least one broadcast channel for the transmission of cell and/or system data to the mobile stations.

The synchronization channel can comprise at least two identical repeated symbols.

The at least one broadcast channel can comprise at least two identical repeated symbols.

The base station and the mobile station (S) can be adapted to use the repeated structure of the synchronization channel and/or the broadcast channel for a frequency and/or time synchronization by means of a correlation detection means.

A general broadcast channel can be provided in every frame and an optional broadcast channel can be only provided when the capacity of the general broadcast channel is not sufficient or when specific data are to be transmitted to dedicated mobile stations.

At least for the transmission of the downlink channel of the header slot an OFDM system comprising a plurality of equally spaced subcarriers can be used.

The time duration of a symbol of the synchronization channel can be 1/n * (subcarrier spacing), n being an integer greater than 1, of the time duration of the symbols and the traffic channel, and only every n-th subcarrier is modulated in the synchronization channel. The synchronization channel can be comprised of two identical repeated symbols having respectively a time duration of 30 microseconds, wherein a basic subcarrier spacing of 4.167 kHz is used for the OFDM system and only every eighth subcarrier is modulated.

The time duration of one timeslot can be equal to the time duration of one timeslot according to the GSM standard.

Now the present invention will be explained with reference to embodiments of the present invention and on the basis of the accompanying drawings.

Figure 1:
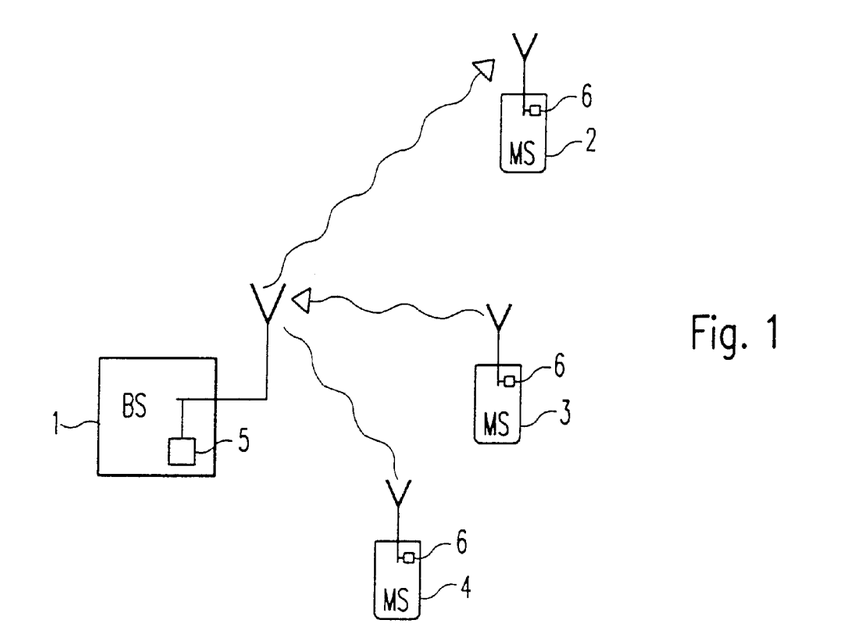
FIG. 1 generally shows a wireless transmission system.

As can be seen from FIG. 1, a wireless transmission system according to the present invention comprises, as it is well-known, a base station 1 and a plurality of mobile stations 2, 3, 4. Each of the mobile stations 2, 3, 4 comprises a synchronization (correlation) detection means 6. The functioning and operation of the correlation detection means 5 and 6, respectively, will be explained later on.

Figure 3:
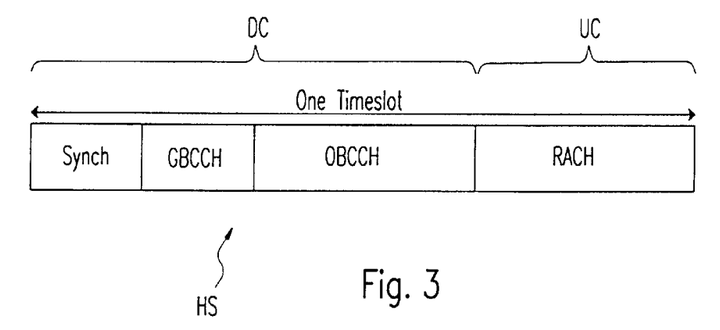
FIG. 3 shows the structure of a header slot of a TDD frame according to the present invention.

In FIG. 3 the structure of a header slot (HS) according to the present invention is shown.

As can be seen from FIG. 3 the header according to the present invention does only occupy one single timeslot (header slot HS) of the TDD frame. The header slot HS according to the present invention is comprised of a downlink channel DC for the transmission of data from a base station to mobile stations and an uplink channel UC for the transmission of data from a mobile station to a base station. The downlink channel DC comprises a synchronization channel SYNCH, a general broadcast channel GBCCH and an optional broadcast channel OBCCH. The uplink channel UC comprises a random access channel RACH.

The data of the synchronization channel SYNCH allow easy, i.e. fast and accurate, synchronization regarding the time and the frequency of mobile stations to the base station frame timing and carrier frequency. The synchronization channel SYNCH is transmitted in every frame.

The broadcast information channels GBCCH, OBCCH distribute cell or system specific information to all mobile stations, including paging messages. According to the present invention the broadcast information channel is separated into two parts: Mandatory broadcast information, which is to be transmitted in every frame, is transmitted in the general broadcast channel GBCCH. The optional broadcast channel OBCCH can be transmitted if the general broadcast channel GBCCH traffic capacity is too small or specific (not really general and very important on a time critical) messages have to be transmitted. The general broadcast channel GBCCH is transmitted in every frame, in contrast thereto the optional broadcast channel OBCCH is optional in each frame. If the optional broadcast channel OBCCH is not transmitted, it can be reused for the transmission of user-specific control channels (like slow associated control channel SACCH or fast associated control channel FACCH).

The random access channel RACH of the uplink channel of the header slot HS according to the present invention is a reserved time during which mobile stations can attempt to send unsynchronized (not yet in a traffic mode) information (random access channel) in order to create dedicated traffic channels.

As has already been noted, the entire header according to the present invention fits into one timeslot (header slot HS) of the TDD structure. The timeslot can be for example a GSM timeslot, the time duration of approximately 576.9 microseconds.

The header structure according to the present invention is particularly advantageous in combination with a so-called OFDM system.

Figure 7:
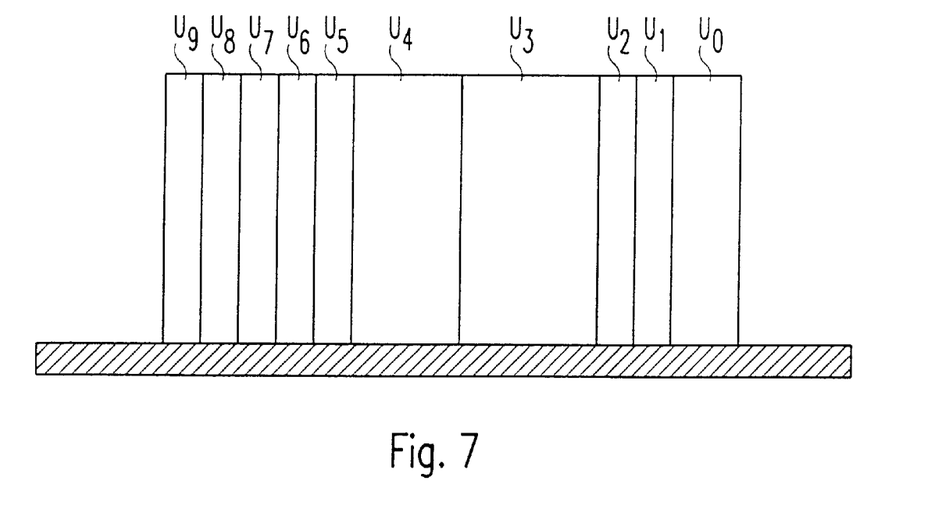
FIG. 7 shows a first group of channels according to an OFDM/TDMA system having variable sizes.
Figure 8:
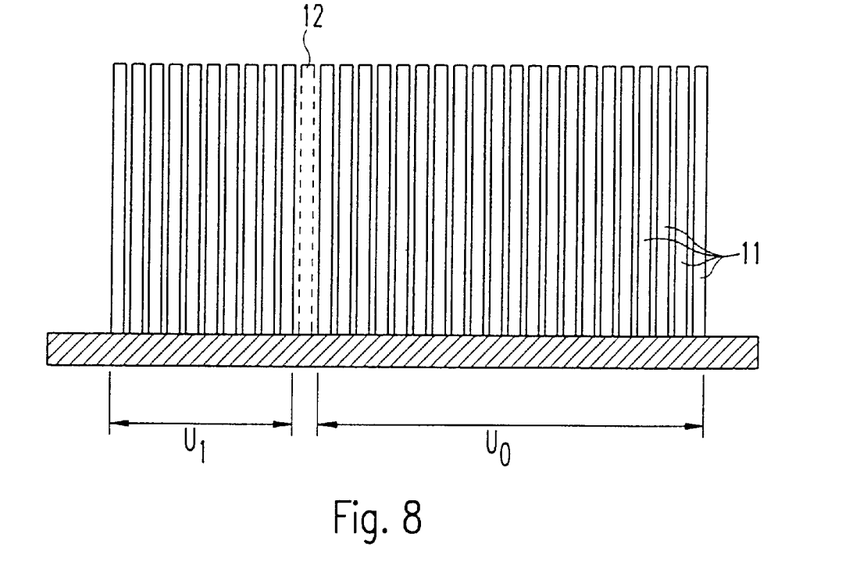
FIG. 8 shows two of the channels shown in FIG. 7 in more detail to explain the variable number of subcarriers in each channel.

A transmission method and a transmission apparatus for transmitting signals on the basis of a OFDM/TDMA-system are explained relating to FIGS. 7–10 of the present application. In such a transmission method and apparatus, a plurality of subcarriers 11 being orthogonal to each other can be allocated to a variable number of channels $U_0, U_1 \ldots U_9$, each channel $U_0, U_1 \ldots U_9$ containing a variable number of subcarriers 11 depending on information to be transmitted as shown in FIGS. 7–10. FIG. 7 shows a group of ten frequency channels $U_0, U_1 \ldots U_9$. Each frequency channel $U_0, U_1 \ldots U_9$ can contain a variable number of subcarriers depending on information to be transmitted, as shown for the channels $U_0$ and $U_1$ in FIG. 8. The channel $U_0$ contains a plurality of subcarriers 11, and the channel $U_1$ contains a number of subcarriers 11 different from channel $U_0$. In a transmission method and the transmission apparatus for transmitting signals on the basis of a OFDM/TDMA-system, a variable number of subcarriers 11 can be allocated to each channel depending on the amount of information to be transmitted. The channel $U_0$ shown in FIG. 8 contains 21 subcarriers 11, whereas the channel $U_1$ shown in FIG. 8 contains only 10 subcarriers 11. Therefore, the channel $U_0$ can be transmitted by more than twice the transmission rate of the channel $U_0$. On the border of each channel $U_0$, $U_1$ . . . $U_9$, a single subcarrier having zero power is placed as guard band 12 to minimize interference to users placed in the adjacent frequency band or to fulfill certain spectrum masks. If the influence of an interference by the band in the neighborhood is small, the guard band 12 need not to be provided, whereas, when the influence is excessive, a plurality of guard bands 12 can be provided.

Figure 9:
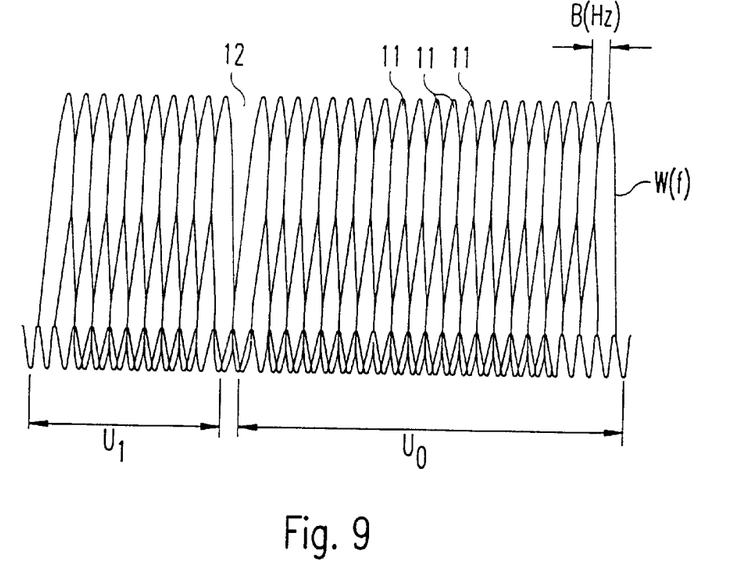
FIG. 9 shows the wave form of the subcarriers and the two channels shown in FIG. 8 in more detail.

The subcarriers 11 are generated by orthogonal frequency division multiplex (OFDM) processing. As shown in FIG. 9, W(f) indicates a wave form indicating an energy on the frequenxy axis and B(Hz) indicates the distance between two adjacent subcarriers. The OFDM processing provides for a multi-subcarrier-system, wherein the number of channels which can be multiplexed is not limited by an interference from the other channels and can be freely determined depending on the bandwidth to be allocated. By changing the number of the subcarriers to be allocated to the different channels, it is possible to change the transmission rate or to achieve a variable transmission rate. The subcarriers between the respective channels can be easily separated by means of a filter, thereby making it possible to prevent deterioration of S/N characteristics. Since the OFDM processing is used for the multi-subcarrier modulation, a guard band S is not necessarily needed between different channels, thereby achieving a very high spectral efficiency. Further on, because fast Fourier transformation can be utilized, the necessary processing can be rapid and small.

Figure 10:
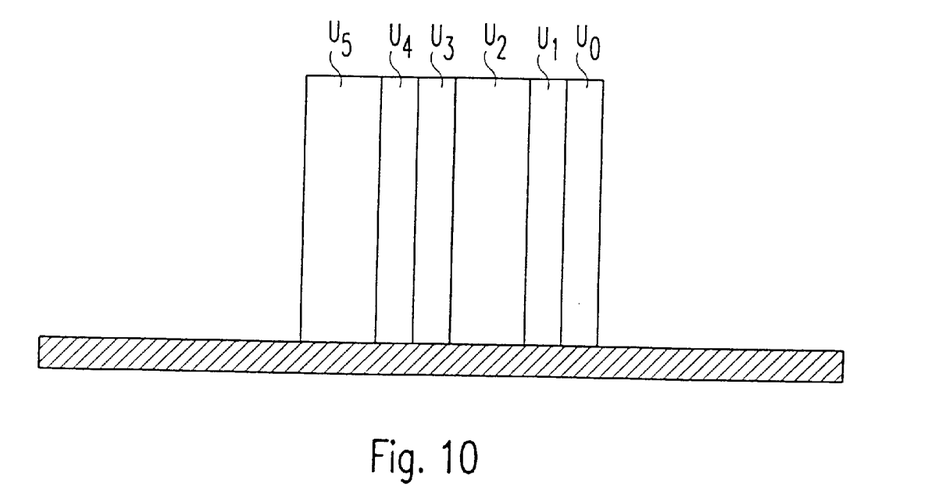
FIG. 10 shows a second group of channels different from the group shown in FIG. 7 to explain the variable group size in an OFDM/TDMA system which can find application together with the present invention.

Further on, the number of channels in each group of channels can be varied, as shown in FIG. 10. In FIG. 10, a group of six channels $U_0$, $U_1$ . . . $U_5$ is shown. In a OFDM/TDMA-system, the number of channels in a group of channels can be varied within the system frequency band depending on information to be transferred.

In the known and standardized GSM-System, a type of single carrier frequency modulation called GMSK is used. The frequency channels are constant and the spacing between adjacent frequency channels is 200 kHz. The number of FDMA-channels is 124 and a time division multiple access (TDMA) is used to support the number of parallel connections. The TDMA scheme in the GSM-System is 8 GSM-timeslots within one time frame. The GSM-timeslot length is 576.9 μs (15/26 ms). The transmitted GSM-timeslots are not fully occupied by the transmitted burst to reduce interference from adjacent GSM-timeslots if the system is not perfectly synchronized. The guard period is 8.25 bits, which corresponds to 30.5 μs. The guard period is divided in two parts, wherein one of the parts is located at the beginning of the GSM time slot, and the other part is located at the end of the GSM-timeslot.

To achieve a GSM timeslot compatible OFDM signal, the following parameters are selected for a header slot according to the present invention:

The basic subcarrier spacing is preferably (100 kHz/24)= 4.16666 kHz, which results in an OFDM symbol time in duration of 240 microseconds. Each OFDM symbol is extended by a guard time (cyclic extension) to avoid ISI (intersymbol interference) in the multipath radio channel. The guard time is split into a pre-guard time and a post-guard time. Additionally a cosine roll-off window is applied to reduce the high frequency of a band spectrum. The detailed structure of a downlink channel of a header structure of a TDD system according to the present invention along with the preferred time parameters is shown in FIG. 4.

Figure 4:
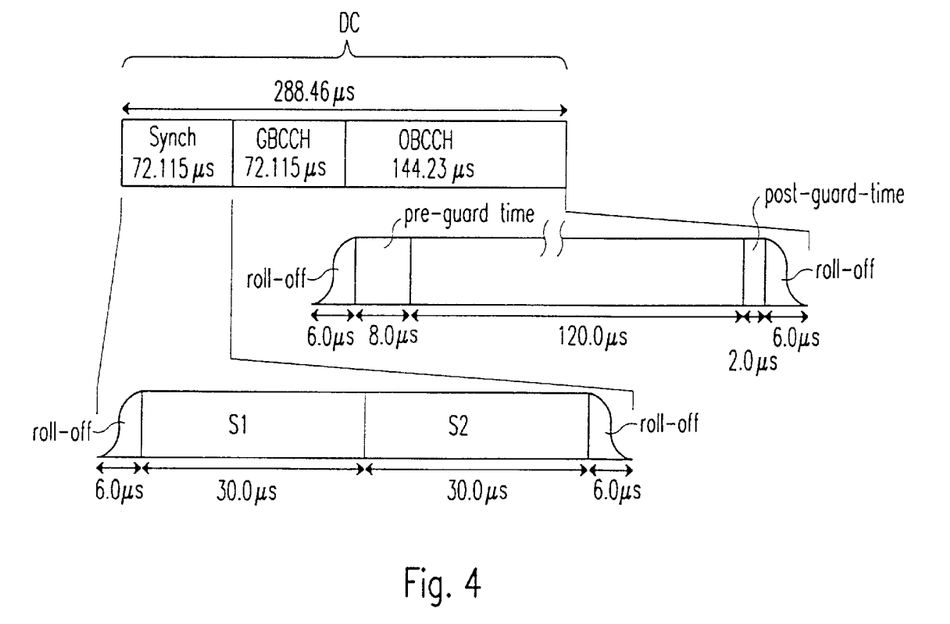
FIG. 4 shows in detail the structure of a downlink channel of a header slot of a TDD frame according to the present invention.

The parameters as shown in FIG. 4 (subcarrier spacing, guard times, roll-off times) are particularly well-matched to the GSM system and represent a subset of the whole header definition according to the present invention.

The timeslot structure is compatible to GSM timeslots, wherein according to the present invention one header slot fits entirely into one GSM timeslot. The first half of the GSM timeslot is occupied by SYNCH, GBCCH and OBCCH, whereas the second half of the GSM timeslot is reserved for the uplink RACH transmission.

In the synchronization channel SYNCH two short repeated identical symbols are transmitted. The repeated structure of the synchronization channel SYNCH can be used for a correlation detection and the correlation detection means 5, 6 in view of a frequency and time synchronization of the mobile stations 2, 3, 4. A good correlation result will be achieved, as each symbol of the synchronization channel SYNCH comprises a large number of samples which can be correlated in the correlation detection means 5, 6.

Each symbol S1, S2 has a time duration of 30 microseconds according to the preferred embodiment. The symbol duration can be created by modulating only every eighth subcarrier of the OFDM system, which generates a basic symbol time duration of 240 microseconds/8=30 microseconds. The symbols S1, S2 can be variable data containing information in the proper sense or dedicated (fixed) symbols optimized for the correlation synchronization procedure. The time domain correlation techniques effected by the correlation detecting means 5, 6 therefore allow a precise detection of time and frequency (offset) information. Additional synchronization can be achieved by usage of the information symbols of the subcarriers.

Alternatively to the OFDM system the transmission of the synchronization channel SYNCH can be effected by a single carrier, wherein the time/frequency synchronization can be done by means of dedicated data sequences(e.g. CAZAC sequences) and appropriate time domain pulse shaping.

The synchronization channel occupies the whole carrier band width. An appropriate guard time (cyclic extension) and a roll-off can be added to the two symbols S1, S2 of the synchronization channel SYNCH. However, it is to be noted, that due to the repetition of the two symbols S1, S2 the guard time can even be suppressed.

Thereby it is to be noted, that a preferred application of the header structure according to the present invention lies in the indoor environment and low range outdoor environment in which guard times can be very short or even suppressed due to negligible multipath effects.

The general broadcast channel GBCCH contains necessary mandatory information as for example information for the mobile stations regarding frequency hopping patterns and the data format to be used for the random access channel (uplink channel RACH). The general broadcast channel can have the same format as the synchronization channel SYNCH. Therefore, the general broadcast channel GBCCH can also contain two repeated symbols which can be used for the correlation procedure. The symbols can also be created by modulation of every eighth subcarrier in the case of an OFDM system, which will generate basic symbols of 240 microseconds/8=30 microseconds.

Typically, the general broadcast channel GBCCH occupies the whole carrier bandwidth, but depending on the specific design it can also be allocated in parts of the carrier bandwidth only by selecting a subset of the available subcarriers of the whole carrier, which is typically advantageous of the frequency flexibility of the OFDM system.

The optional broadcast channel OBCCH contains optional information for the mobile stations as for example modifying information for the uplink/downlink structure of the traffic slots of the TDD frame. For the optional broadcast channel OBCCH one short symbol with a duration of 120 microseconds is transmitted. The symbol can be created in the OFDM system by modulating every second subcarrier which will generate a basic symbol duration of 240 microseconds/2=120 microseconds. A small pre-guard time (8 microseconds) and a post-guard time (2 microseconds) can be added to mitigate the multipath radio channel and relax synchronization accuracy requirements. The cosine roll-off reduces the out of band spurious emissions.

Figure 6:
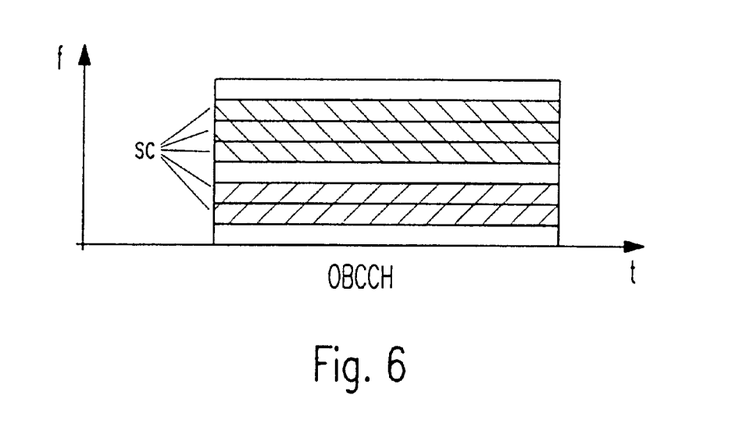
FIG. 6 shows the multiple subcarrier structure of an optional broadcasting channel of a header slot according to the present invention when an OFDM system is used for the transmission of the optional broadcasting channel.

The optional broadcast channel can occupy the whole carrier band width, but depending on the design it can also be allocated in parts of the carrier bandwidth only by selecting a subset of the available subcarriers SC of the whole carrier. Such an example is shown in FIG. 6. As can be seen from FIG. 6 by means of different hatches, two different groups of subcarriers are allocated for example for dedicated individual mobile stations. In the case of the example of FIG. 6, not the whole bandwidth is used for the transmission of the optional broadcast channel OBCCH.

Figure 5:
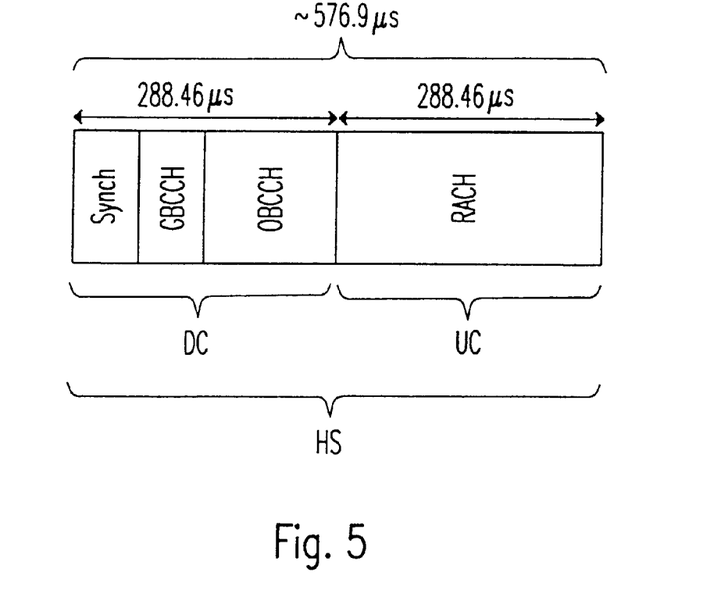
FIG. 5 shows the structure and preferable parameters of a header slot according to the present invention.

The random access channel RACH (see FIG. 5) is allocated in the second half of the frame header slot (GSM slot e.g.) of the present invention. The random access channel (RACH) is uplink specific. The random access channel (RACH) signal format is not specified in the frame of the present invention as the downlink and the uplink could use different transmission schemes (e.g. single carrier transmission for the uplink and OFDM transmission in the downlink).

Figure 11:
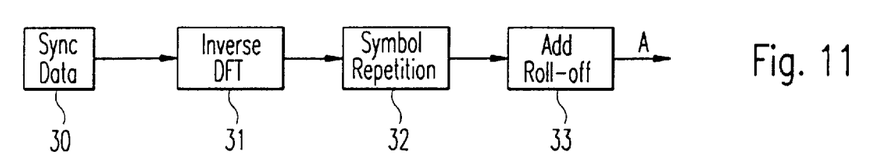
FIGS. 11 to 15 show block diagrams of different implementations to achieve the header structure for a TDD system according to the present invention.

FIG. 11 shows a block diagram for the synchronization channel SYNCH generation, in case the synchronization channel SYNCH is created in the OFDM (subcarrier) domain. Synchronization data 31 can be a fixed (known) information sequence (complex symbols). Alternatively, the synchronization data of the synchronization channels SYNCH can be a non-fixed information sequence (complex symbols).

The inverse DFT (discrete Fourier transform) 31 performs the transformation from the frequency domain into the time domain. The symbol repetition unit 32 creates a time domain sequence which consists of a two part structure by repeating the output of the IDFT 31. The add roll-off block 33 is optional and can be used for spectrum shaping by adding a roll-off.

Figure 12:
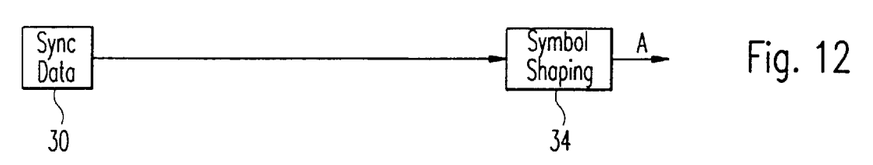

As can be seen from FIG. 12, alternatively the synchronization information for the synchronization channel SYNCH can be a fixed (single carrier) synchronization sequence, such that no inverse DFT 31 and symbol repetition 32 is needed. The synchronization data 30 are output to a symbol shaping unit 34 in this case.

Figure 13:
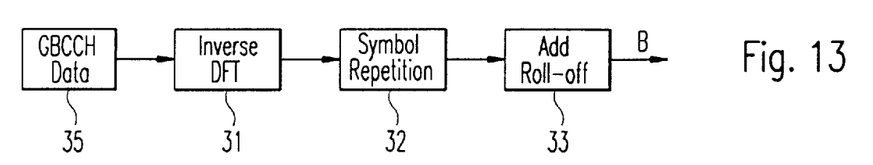

As can be seen from FIG. 13 for the creation of the GBCCH burst, the GBCCH burst can be created in the OFDM (subcarrier domain). The GBCCH data 35 are given to an inverse discrete Fourier transformation circuit 31, a symbol repetition unit 32 and the add roll-off block 33.

Figure 14:
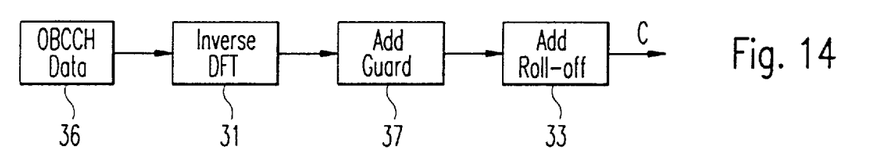

As can be seen from FIG. 14 for the generation of the OBCCH burst, the OBCCH burst can be created in the OFDM (subcarrier) domain. The OBCCH data 36 are given to an inverse discrete Fourier transformation circuit 31, then to a guard adding circuit 37 and are output from the add roll-off circuit 33.

Figure 15:
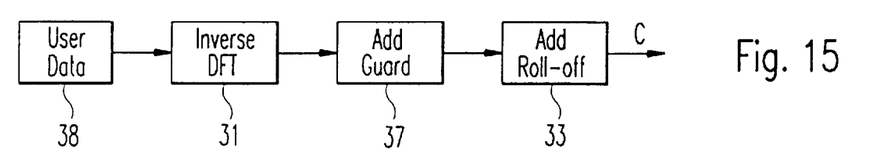

If no OBCCH transmission is required, the OBCCH slot can be used for transmitting user-specific information, as it is shown in FIG. 15. In contrast to the block diagram of FIG. 14, in FIG. 15 user data 38 are input to the inverse discrete Fourier transformation 31.

Figure 16:
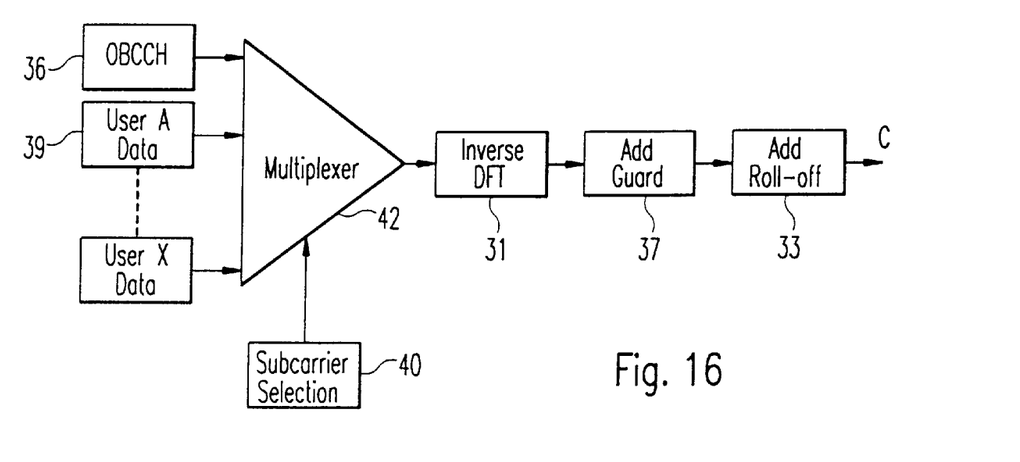
FIG. 16 and FIG. 17 show an implementation to use the time duration of the OBCCH both for OBCCH information and user information by allocating different subsets of the available subcarriers when using an OFDM system.

FIG. 16 shows an embodiment to use the OBCCH timeslot partly for OBCCH information and partly for user information by allocating different subsets of the available subcarriers. A subcarrier selection circuit 40 selects which part of the subcarriers are allocated for OBCCH data 36 and user data 39, respectively. The selected data are output to the inverse discrete Fourier transformation circuit 31.

Figure 17:
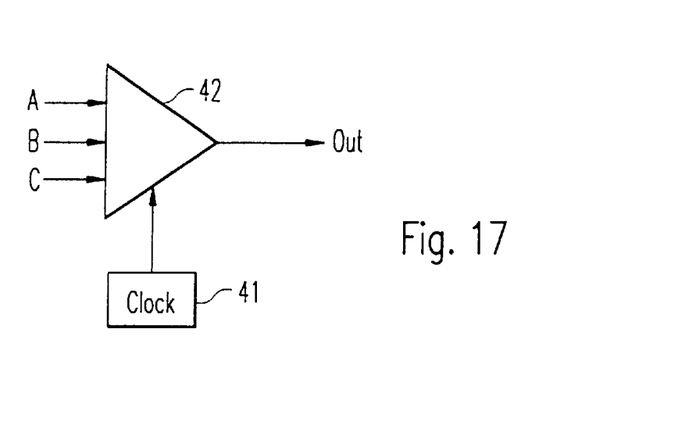

FIG. 17 shows a hardware implementation for the creation of the first half (downlink channel) of the header according to the present invention using a multiplexer 42, which multiplexes the different bursts into one timeslot (first half of the header). The second half of the timeslot is left for RACH. The multiplexer 42 is controlled by a clock 41.

According to the present invention therefore for the first time a TDD header is defined which can be used in OFDM-TDD systems. Using the general idea and selecting the appropriate parameters as for example shown in the embodiments a structure fully compatible to GSM is achieved. Particularly the flexibility in bandwidth of the specific broadcast channel (by selecting subsets of the whole available subcarriers within the carrier) of OFDM is used.

What is claimed is:

1. Wireless transmission method, comprising the step of:
    transmitting data in frames according to a time divisional duplex (TDD) system,
    wherein frame comprises a header slot (HS) and a plurality of traffic slots (TS),
    wherein the header slot (HS) and the individual traffic slots (TS) have the same time duration,
    wherein the header slot (HS) occupies a single time slot, and
    wherein the header slot (HS) is subdivided into:
        a downlink channel (DC) for the transmission of synchronization data (SYNCH) and system data from a base station (1) to at least one mobile station (2, 3, 4), and
        an uplink channel (UC) for the transmission of registration data (RACH) from at least one mobile station (3) to the base station (1).

2. Wireless transmission method according to claim 1, characterized in that the downlink channel (DC) and the uplink channel (UC) of the header slot (HS) have the same time duration.

3. Wireless transmission method according to claim 1, characterized in that the downlink channel (DC) of the header slot (HS) comprises a synchronization channel (SYNCH) and at least one broadcast channel (GBCCH, OBCCH) for the transmission of cell and/or system data to all or selected mobile stations (2, 3, 4).

4. Wireless transmission method, comprising the step of:
    transmitting data in frames according to a time divisional duplex (TDD) system,
    wherein each frame comprises a header slot (HS) and a plurality of traffic slots (TS),
    wherein the header slot (HS) and the individual traffic slots (TS) have the same time duration,
    wherein the header slot (HS) occupies a single time slot,
    wherein the header slot (HS) is subdivided into:
        a downlink channel (DC) for the transmission of synchronization data (SYNCH) and system data from a base station (1) to at least one mobile station (2, 3, 4), and an uplink channel (UC) for the transmission of registration data (RACH) from at least one mobile station (3) to the base station (1), wherein the downlink channel (DC) of the header slot (HS) comprises a synchronization channel (SYNCH) and at least one broadcast channel (GBCCH, OBCCH) for the transmission of cell and/or system data to all or selected mobile stations (2, 3, 4), and wherein the synchronization channel (SYNCH) of the header slot (HS) comprises at least two identical repeated symbols (S1,S2).

5. Wireless transmission method, comprising the step of:

transmitting data in frames according to a time divisional duplex (TDD) system, wherein each frame comprises a header slot (HS) and a plurality of traffic slots (TS), wherein the header slot (HS) and the individual traffic slots (TS) have the same time duration, wherein the header slot (HS) occupies a single time slot, wherein the header slot (HS) is subdivided into:
a downlink channel (DC) for the transmission of synchronization data (SYNCH) and system data from a base station (1) to at least one mobile station (2, 3, 4), and
an uplink channel (UC) for the transmission of registration data (RACH) from at least one mobile station (3) to the base station (1), wherein the downlink channel (DC) of the header slot (HS) comprises a synchronization channel (SYNCH) and at least one broadcast channel (GBCCH, OBCCH) for the transmission of cell and/or system data to all or selected mobile stations (2, 3, 4), and wherein the at least one broadcast channel (GBCCH, OBCCH) of the header slot (HS) comprises at least two identical repeated symbols.

6. Wireless transmission method according to claim 4, characterized in that a repeated structure of the synchronization channel (SYNCH) and/or the broadcast channel (GBCCH, OBCCH) of the header slot (HS) is used for a frequency and/or time synchronization by means of a correlation technique (5, 6).

7. Wireless transmission method, comprising the step of:

transmitting data in frames according to a time divisional duplex (TDD) system, wherein each frame comprises a header slot (HS) and a plurality of traffic slots (TS), wherein the header slot (HS) and the individual traffic slots (TS) have the same time duration, wherein the header slot (HS) occupies a single time slot, wherein the header slot (HS) is subdivided into:
a downlink channel (DC) for the transmission of synchronization data (SYNCH) and system data from a base station (1) to at least one mobile station (2, 3, 4), and
an uplink channel (UC) for the transmission of registration data (RACH) from at least one mobile station (3) to the base station (1), wherein the downlink channel (DC) of the header slot (HS) comprises a synchronization channel (SYNCH) and at least one broadcast channel (GBCCH, OBCCH) for the transmission of cell and/or system data to all or selected mobile stations (2, 3, 4), wherein a general broadcast channel (GBCCH) is transmitted in the header slot (HS) of every frame, and wherein an optional broadcast channel (OBCCH) is only transmitted when the capacity of the general broadcast channel (GBCCH) is not sufficient or when specific data are to be transmitted.

8. Wireless transmission method according to claim 7, characterized in that, at least for transmission of the optional broadcast channel (OBCCH) of the header slot (HS), an OFDM system with a plurality of subcarriers (SC) is used.

9. Wireless transmission method, comprising the step of:

transmitting data in frames according to a time divisional duplex (TDD) system, wherein each frame comprises a header slot (HS) and a plurality of traffic slots (TS), wherein the header slot (HS) and the individual traffic slots (TS) have the same time duration, wherein the header slot (HS) occupies a single time slot, and wherein the header slot (HS) is subdivided into:
a downlink channel (DC) for the transmission of synchronization data (SYNCH) and system data from a base station (1) to at least one mobile station (2, 3, 4), and
an uplink channel (UC) for the transmission of registration data (RACH) from at least one mobile station (3) to the base station (1), wherein, at least for the transmission of the synchronization channel, (SYNCH) an OFDM system comprising a plurality of equally spaced subcarriers (SC) is used, and wherein the time duration of a symbol (S1, S2) of the synchronization channel (SYNCH) is (1/n)×(the subcarrier spacing of the OFDM system), n being an integer greater than 1, of the time duration of OFDM modulated symbols in a traffic channel (TC), and only every n-th subcarrier (SC) is modulated in the synchronization channel (SYNCH).

10. Wireless transmission method according to claim 8, characterized in that the synchronization channel (SYNCH) is comprised of two identical repeated symbols (S1, S2) having respectively a time duration of 30 microseconds, and wherein a basic subcarrier spacing of 4.167 kHz is used for the OFDM system and only every eighth subcarrier (SC) is modulated in the synchronization channel (SYNCH).

11. Wireless transmission method according to claim 8, characterized in that in the optional broadcast channel (OBCCH) of the header slot (HS) a subset of subcarriers (SC) is allocated to the transmission of data of a predetermined mobile station (2, 3, 4).

12. Wireless transmission method according to claim 1, characterized in that the time duration of one time slot (HS, TS) is equal to the time duration of one time slot according to a GSM standard.

13. Wireless transmission method according to claim 1, whereby said wireless transmission method is used for indoor and low range outdoor wireless transmissions.

14. Wireless transmission system, comprising:
a base station (1); and
at least one mobile station (2, 3, 4),
wherein the base station (1) and the mobile station (2, 3, 4) transmit data in frames according to a time divisional duplex (TDD) system,
wherein each frame comprises a header slot (HS) and a plurality of traffic slots (TS),
wherein the header slot (HS) comprises one single time slot, wherein the header slot (HS) and the individual traffic slots (TS) have the same time duration, and wherein the header slot is subdivided into:

a downlink channel (DC) for the transmission of synchronization data (SYNCH) and system data from said base station (1) to said at least one mobile station (2, 3, 4), and an uplink channel (UC) for the transmission of registration data (RACH) from said at least one mobile station (2, 3, 4) to the base station (1).

15. Wireless transmission system according to claim 14, characterized in that the downlink channel (DC) and the uplink channel (UC) of the header slot (HS) have the same time duration.

16. Wireless transmission system according to claim 14, characterized in that the downlink channel (DC) of the header slot (HS) comprises a synchronization channel (SYNCH) and at least one broadcast channel (GBCCH, OBCCH) for the transmission of cell and/or system data.

17. Wireless transmission system, comprising:

a base station (1); and at least one mobile station (2, 3, 4), wherein the base station (1) and the mobile station (2, 3, 4) transmit data in frames according to a time divisional duplex (TDD) system, wherein each frame comprises a header slot (HS) and a plurality of traffic slots (TS), wherein the header slot (HS) comprises one single time slot, wherein the header slot (HS) and the individual traffic slots (TS) have the same time duration, wherein the header slot is subdivided into:

a downlink channel (DC) for the transmission of synchronization data (SYNCH) and system data from said base station (1) to said at least one mobile station (2, 3, 4), and an uplink channel (UC) for the transmission of registration data (RACH) from said at least one mobile station (2, 3, 4) to the base station (1), wherein the downlink channel (DC) of the header slot (HS) comprises a synchronization channel (SYNCH) and at least one broadcast channel (GBCCH, OBCCH) for the transmission of cell and/or system data, and wherein the synchronization channel (SYNCH) of the header slot (HS) comprises at least two identical repeated symbols (S1, S2).

18. Wireless transmission system, comprising:

a base station (I); and at least one mobile station (2, 3, 4), wherein the base station (1) and the mobile station (2, 3, 4) transmit data in frames according to a time divisional duplex (TDD) system, wherein each frame comprises a header slot (HS) and a plurality of traffic slots (TS), wherein the header slot (HS) comprises one single time slot, wherein the header slot (HS) and the individual traffic slots (TS) have the same time duration, wherein the header slot is subdivided into:

a downlink channel (DC) for the transmission of synchronization data (SYNCH) and system data from said base station (1) to said at least one mobile station (2, 3, 4), and an uplink channel (UC) for the transmission of registration data (RACH) from said at least one mobile station (2, 3, 4) to the base station (1), wherein the downlink channel (DC) of the header slot (HS) comprises a synchronization channel (SYNCH) and at least one broadcast channel (GBCCH, OBCCH) for the transmission of cell and/or system data, and wherein the at least one broadcast channel (GBCCH, OBCCH) of the header slot (HS) comprises at least two identical repeated symbols.

19. Wireless transmission system according to claim 17, characterized in that the base station (1) and the mobile station (2, 3, 4) use a repeated structure of the synchronization channel (SYNCH) and/or the broadcast channel (GBCCH, OBCCH) for a frequency and/or time synchronization by means of a correlation detection means (5, 6).

20. Wireless transmission system, comprising:

a base station (1); and at least one mobile station (2, 3, 4), wherein the base station (1) and the mobile station (2, 3, 4) transmit data in frames according to a time divisional duplex (TDD) system, wherein each frame comprises a header slot (HS) and a plurality of traffic slots (TS), wherein the header slot (HS) comprises one single time slot, wherein the header slot (HS) and the individual traffic slots (TS) have the same time duration, wherein the header slot is subdivided into:

a downlink channel (DC) for the transmission of synchronization data (SYNCH) and system data from said base station (1) to said at least one mobile station (2, 3, 4), and an uplink channel (UC) for the transmission of registration data (RACH) from said at least one mobile station (2, 3, 4) to the base station (1), wherein the downlink channel (DC) of the header slot (HS) comprises a synchronization channel (SYNCH) and at least one broadcast channel (GBCCH, OBCCH) for the transmission of cell and/or system data, wherein a general broadcast channel (GBCCH) is provided in the header slot (HS) of every time frame, and wherein an optional broadcast channel (OBCCH) is only provided when the capacity of the general broadcast (GBCCH) is not sufficient or when specific data are to be transmitted.

21. Wireless transmission system, comprising:

abase station (1); and at least one mobile station (2, 3, 4), wherein the base station (1) and the mobile station (2, 3, 4) transmit data in frames according to a time divisional duplex (TDD) system, wherein each frame comprises a header slot (HS) and a plurality of traffic slots (TS), p1 wherein the header slot (HS) comprises one single time slot, wherein the header slot (HS) and the individual traffic slots (TS) have the same time duration, wherein the header slot is subdivided into:

a downlink channel (DC) for the transmission of synchronization data (SYNCH) and system data from said base station (1) to said at least one mobile station (2, 3, 4), and an uplink channel (UC) for the transmission of registration data (RACH) from said at least one mobile station (2, 3, 4) to the base station (1), wherein the downlink channel (DC) and the uplink channel (UC) of the header slot (HS) have the same time duration, and wherein, at least for the transmission of the downlink channel (DC) of the header slot (HS), an OFDM system comprising a plurality of equally spaced subcarriers (SC) is used.

22. Wireless transmission system according to claim 21, characterized in that the time duration of a symbol (S1, S2) of the synchronization channel (SYNCH) is (1/n)×(the subcarrier spacing of the OFDM system), n being an integer greater than 1, of the time duration of OFDM modulated symbols in a traffic channel (TC), and only every n-th subcarrier (SC) is modulated in the synchronization channel (SYNCH).

23. Wireless transmission system according to claim 21, characterized in that the synchronization channel (SYNCH) is comprised of two identical repeated symbols (S1, S2) having respectively a time duration of 30 microseconds, wherein a basic subcarrier spacing of 4.167 kHz is used for the OFDM system and only every eighth subcarrier (SC) is modulated.

24. Wireless transmission system according to claim 15, characterized in that the time duration of one time slot is equal to the time duration of one time slot according to a GSM standard.

* * * * *